No. 807,771. PATENTED DEC. 19, 1905.
I. H. PLEUKHARP.
SPEED CHANGING AND TRANSMISSION GEARING.
APPLICATION FILED MAY 10, 1905.
2 SHEETS—SHEET 1.
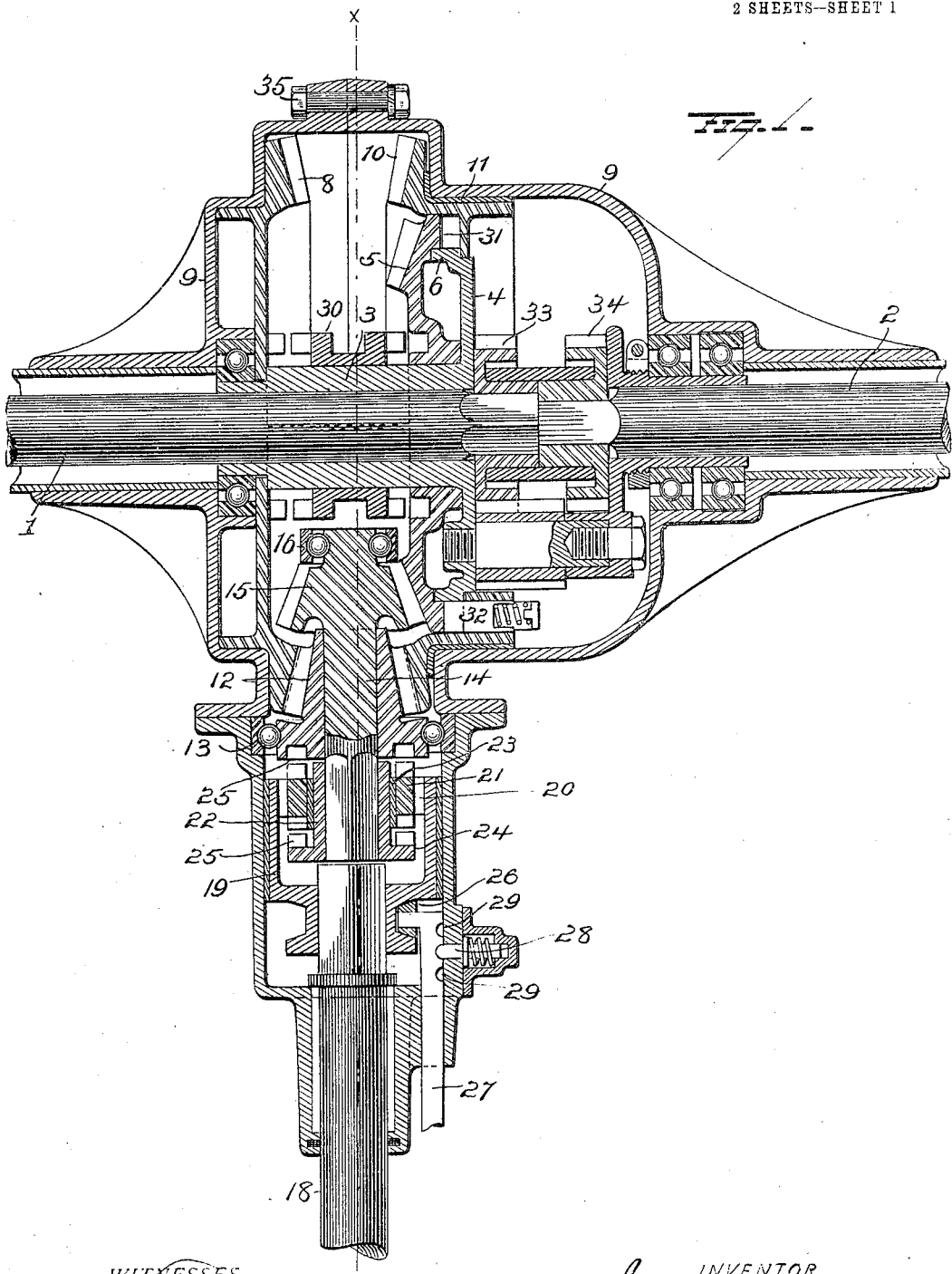

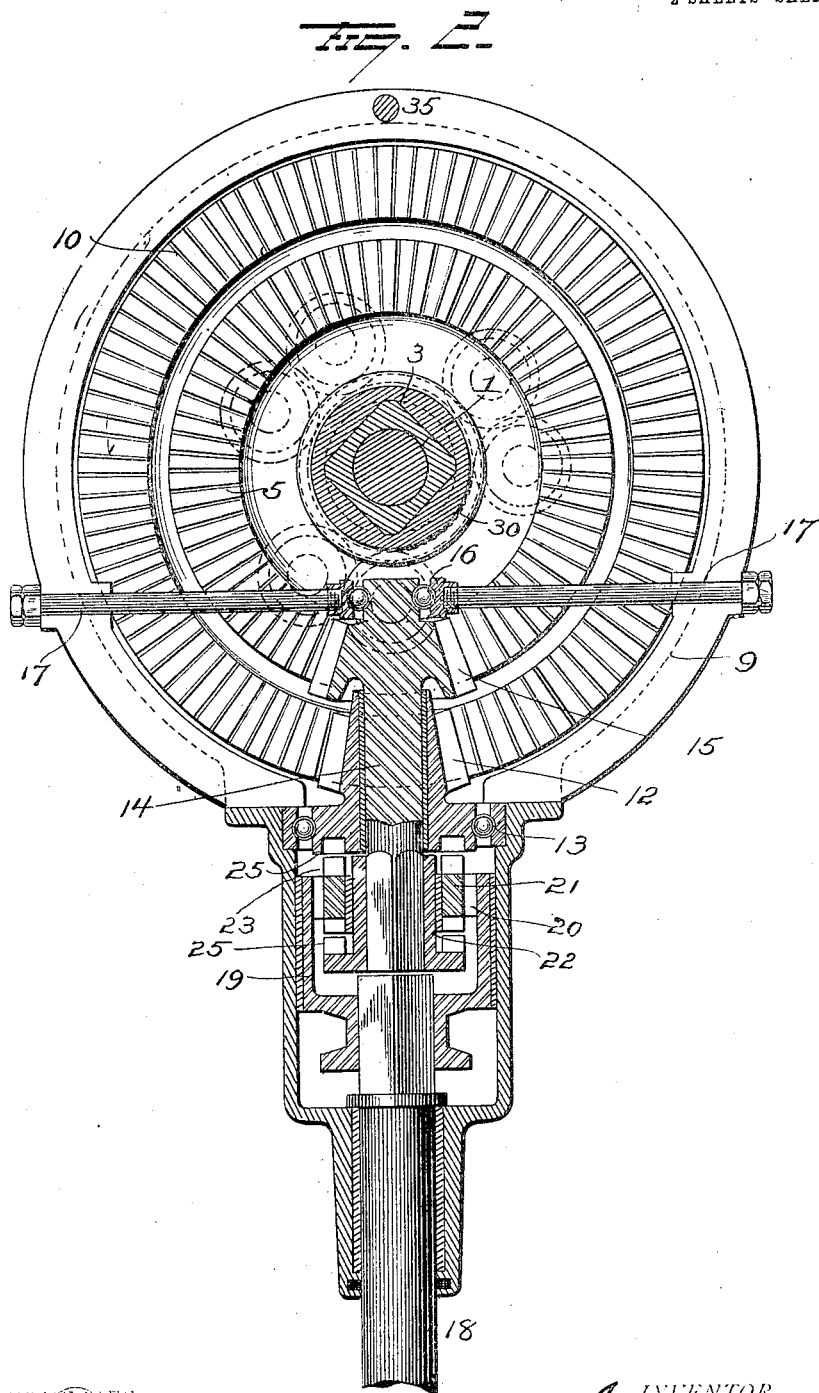

UNITED STATES PATENT OFFICE.

IRVIN H. PLEUKHARP, OF COLUMBUS, OHIO.

SPEED CHANGING AND TRANSMISSION GEARING.

No. 807,771.　　　　Specification of Letters Patent.　　　　Patented Dec. 19, 1905.

Application filed May 10, 1905. Serial No. 259,804.

*To all whom it may concern:*

Be it known that I, IRVIN H. PLEUKHARP, a resident of Columbus, in the county of Franklin and State of Ohio, have invented certain new and useful Improvements in Speed Changing and Transmission Gearing; and I do hereby declare the following to be a full, clear, and exact description of the invention, such as will enable others skilled in the art to which it appertains to make and use the same.

My invention relates to improvements in speed changing and transmisson gearing, the object of the invention being to provide an improved construction and arrangement of gearing in which all gearing is always maintained in mesh whether idle or in motion and the operation of the several gears controlled by improved clutches at the will of the operator.

A further object is to provide improvements of this character of simple construction, compact in formation, strong and durable in use, and employing the minimum in number and size of parts to secure efficiency.

With these and other objects in view the invention consists in certain novel features of construction and combinations and arrangements of parts, as will be more fully hereinafter described, and pointed out in the claims.

In the accompanying drawings, Figure 1 is a view in section, illustrating my improvements; and Fig. 2 is a view in section on the line *x x*.

1 and 2 represent two sections or members constituting the driven shaft or axle of a motor-vehicle or other desired mechanism. A sleeve 3 is mounted to turn freely on axle-section 1 near its end and has an annular flange or disk 4 at one end, and a gear-wheel 5 is mounted to turn freely about sleeve 3 and has an annular groove to receive an annular flange 6 on disk 4 and be strengthened and braced thereby. Supported to turn in my improved housing 9 and opposite to gear 5 is a gear 8, which faces gear 5, but is of appreciably greater diameter and is a low-speed reversing-gear, as will more fully hereinafter appear.

Around the disk 4 and gear 5 and concentric with gear 5 is a low-speed gear 10, supported to turn in the housing, being suitably separated therefrom by a bushing 11 and is of the same diameter as reversing-gear 8 and directly opposite thereto, and both are always in mesh with a beveled pinion 12. This low-speed driving-pinion 12 has suitable ball-bearings 13 and turns about a short shaft 14, carrying at its inner end a high-speed driving-pinion 15 always in mesh with gear 5, and the inner end of this shaft 14 is contracted and supported in ball-bearings 16, secured in position by adjustable rods 17, secured in the housing 9.

18 represents the driving-shaft, supported in alinement with short shaft 14 and made angular throughout a portion of its length, and a sliding sleeve 19 has an angular bore at one end to slide freely on the driving-shaft 18, yet always locked to turn therewith. The main portion of this sleeve 19 is of general cylindrical cup-shape formation separated by a bushing from the housing 9 and connected by internal webs 20 with a clutch 21. This clutch is supported upon and spaced from a sleeve 22 by a bushing 23, and the sleeve 22 has an angular bore to seat upon the angular end portion of short shaft 14. An annular flange 24 is provided on sleeve 22 at one end, and this flange 24 and the end of low-speed pinion 12 facing the same are both made with a series of beveled notches 25 to receive the teeth of clutch 21, and said clutch may be locked to either the sleeve 22 or gear 12 or lie idle between them at the will of the operator.

One improved means for operating the clutch is shown, wherein a roller 26 is located in an annular groove in sliding sleeve 19 and supported upon a shifting-rod 27, projecting out of the housing, and by movement of this rod 27 the clutch can be shifted. To prevent the vibration of the machine causing the clutch to move, a spring-pressed pin 28, having rounded or beveled end, is adapted to enter any of a series of notches 29 in rod 27 and hold the same, yet permit its movement when sufficient force is applied.

That portion of sleeve 3 between gears 5 and 8 is made angular to slidingly key a clutch 30 thereon, and this clutch 30 is similar in construction to clutch 21 and is adapted to lock with either of the gears 5 or 8, according to the direction of movement desired, and said clutch may be controlled by any suitable mechanism not necessary to here describe.

The gear 5 is provided on its rear face with an annular series of ratchet-teeth 31, and gear 10, which overlaps this portion of the gear 5, is provided at intervals with spring-pressed pawls or dogs 32 to engage the ratchet-teeth and lock the gears 12 and 5 together when gear 10 is turned in one direction and permit the gear 5 to turn freely within gear 10 when gear 5 is turned, as the ratchet-teeth will ride fully beneath the pawls.

The adjacent ends of axle-sections 1 and 2 are made angular and have gears 33 and 34 thereon, which constitute a portion of a well-known form of differential gearing which forms no part of the present invention, save that the disk 4, which constitutes the power-transmitting medium from my improved transmitting means, is carried by the sleeve 3, and, further, that the differential gearing is at one side, and a more compact and better construction is secured than heretofore attained by known gearing for the same purpose.

The housing 9, as will be clearly seen, comprises two half-sections suitably flanged and secured by bolts 35, which permit the housing-sections to be separated and moved apart and allow a free unobstructed examination of my improved mechanism and can be secured together and insure an oil-tight casing, permitting the same to hold a quantity of lubricant and the gearing to run easily therein.

The operation of my improvements is as follows: With the parts as shown it will be seen that as clutch 21 is not locked to either the sleeve 22 or pinion 12 the drive-shaft 18 will turn without transmitting motion to the axle. If it is desired to go forward, clutch 21 is moved to lock with pinion 12 by the mechanism above explained, and clutch 30 is locked to gear 5. Motion is then transmitted from drive-shaft 18 to sliding sleeve 19, to clutch 21, to pinion 12, to gear 10, and through the medium of the pawls 32 and ratchet-teeth 31 the gears 10 and 5 are locked together when turned in this direction, and as gear 5 is turned it will cause clutch 30 to turn sleeve 3, and the disk 6 at the end thereof compels the turning of the differential gearing, and motion is transmitted thereby to the axle-sections 1 and 2 to drive forward at low speed. To reverse, clutch 30 is thrown into locked engagement with gear 8, and reverse motion is transmitted from pinion 12 to gear 8 and through the clutch 30 to sleeve 3. To attain high speed, clutch 30 is locked to gear 5 and clutch 21 is moved into locked engagement with sleeve 22, secured to turn with shaft 14. Turning shaft 14 compels high-speed pinion 15 to turn gear 5, which rides freely beneath the pawls 32, and owing to the relative difference in diameters of gears 15 5 and gears 12 10 a greatly-increased speed is attained when gear 15 is the driver.

A great many slight changes might be made in the general form and arrangement of the parts described without departing from my invention, and hence I would have it understood that I do not restrict myself to the precise details set forth, but consider myself at liberty to make such slight changes and alterations as fairly fall within the spirit and scope of my invention.

Having fully described my invention, what I claim as new, and desire to secure by Letters Patent, is—

1. The combination with a gear-wheel, of a larger gear around the same, ratchet means connecting said gears, pinions in mesh with the respective gears, and means for turning either of said pinions.

2. The combination with a gear-wheel, of a larger gear around the same, ratchet means connecting said gears, a reversing-gear facing the larger gear, a pinion in mesh with the smaller gear, another pinion in mesh with both of said larger gears, and means for throwing either of said pinions into operation.

3. The combination with a gear, of a larger gear around the same, an annular series of ratchet-teeth on the back of the smaller gear, spring-pressed pawls carried by the larger gear and engaging said annular series of ratchet-teeth and means for driving either of said gears.

4. The combination with a high-speed gear, of a low-speed gear around the same, a reversing-gear facing the low-speed gear, a driving-pinion in mesh with the high-speed gear, a driving-pinion meshing with the low-speed gear and the reversing-gear, ratchet mechanism connecting the high and low speed gears, and means for connecting either of said pinions with the driving means.

5. The combination with a high-speed gear, of a low-speed gear around the same, ratchet means connecting the gears, a reversing-gear facing the low-speed gear, a driving-pinion meshing with the high-speed gear, a shaft to turn the pinion, a low-speed pinion mounted to turn on the said shaft and meshing with the low-speed and reversing gears, a drive-shaft and clutch mechanism connecting either of the pinions with the drive-shaft.

6. The combination of high and low speed gears, driving-pinions meshing therewith, a shaft fixed to the high-speed pinion and on which the low-speed pinion freely turns, a sleeve keyed to the pinion-shaft, a sliding clutch on said sleeve, a drive-shaft, and means connecting the drive-shaft and clutch and constructed to be moved to lock the clutch with either the low-speed pinion or the sleeve keyed to the high-speed-pinion shaft.

7. The combination of high and low speed gears, driving-pinions meshing therewith, a shaft fixed to the high-speed pinion and on which the low-speed pinion freely turns, a sleeve keyed to the high-speed-pinion shaft, a sliding clutch on said sleeve constructed to lock with either the low-speed pinion or the sleeve on the high-speed-pinion shaft, a drive-shaft, a sliding member keyed to the drive-shaft and connected with the clutch, means for moving the sliding member, and means for holding the sliding member against accidental movement.

8. The combination with two shaft or axle sections and differential gearing connecting them, of a sleeve on one axle-section, a disk at one end thereof constituting a portion of the differential gearing and transmitting driving motion thereto, forward and reverse gears, means for transmitting motion to either of said gears, and a clutch on said sleeve to lock either of said gears thereto.

In testimony whereof I have signed this specification in the presence of two subscribing witnesses.

IRVIN H. PLEUKHARP.

Witnesses:
S. W. FOSTER,
A. W. BRIGHT.